US012752477B2

(12) United States Patent
Furuse et al.

(10) Patent No.: US 12,752,477 B2
(45) Date of Patent: Oct. 6, 2026

(54) MOLDING DEVICE, CLEAR INK COMPENSATION AMOUNT INPUT METHOD, AND MOLDING METHOD

(71) Applicant: MIMAKI ENGINEERING CO., LTD., Nagano (JP)

(72) Inventors: Masayuki Furuse, Nagano (JP); Shunta Hanaoka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 180 days.

(21) Appl. No.: 17/784,673

(22) PCT Filed: Dec. 10, 2020

(86) PCT No.: PCT/JP2020/046005
§ 371 (c)(1),
(2) Date: Jun. 13, 2022

(87) PCT Pub. No.: WO2021/125028
PCT Pub. Date: Jun. 24, 2021

(65) Prior Publication Data

US 2023/0014306 A1 Jan. 19, 2023

(30) Foreign Application Priority Data

Dec. 19, 2019 (JP) ................................ 2019-229023
Dec. 19, 2019 (JP) ................................ 2019-229025

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/393* (2017.08);
(Continued)

(58) Field of Classification Search
CPC ... B29C 64/112; B29C 64/209; B29C 64/165; B29C 64/386; B29C 64/396; B33Y 50/00; B33Y 50/02; B41J 2/2114
See application file for complete search history.

(56) References Cited

U.S. PATENT DOCUMENTS 10,293,545 B2 † 5/2019 Okamoto
2008/0072778 A1 * 3/2008 Nagai ................ B41F 33/0036
101/365
(Continued)

FOREIGN PATENT DOCUMENTS

JP 2006058607 3/2006
JP 2008149315 7/2008
(Continued)

OTHER PUBLICATIONS

Espacenet machine translation of Ochi, JP 2018065308 A, originally published Apr. 26, 2018 (Year: 2018).*
(Continued)

*Primary Examiner* — Farah Taufiq
*Assistant Examiner* — Jennifer L Groux
(74) *Attorney, Agent, or Firm* — JCIPRNET

(57) ABSTRACT

A molding device includes a color inkjet head that ejects a color ink, and a clear inkjet head that ejects a clear ink. The color ink is ejected from the color inkjet head and layered to color and form a molded object, and the clear ink is ejected from the clear inkjet head to compensate the layering amount of the color ink. The molding device includes an input part that inputs the compensation amount of the clear ink such that the impact frequency of the clear ink becomes low at a place where the impact frequency of the color ink in coloring and forming the molded object is high, and the impact frequency of the clear ink becomes high at a place
(Continued)

where the impact frequency of the color ink is low for each layer forming the molded object.

5 Claims, 10 Drawing Sheets

(51) Int. Cl.

| | |
|---|---|
| ***B29C 64/393*** | (2017.01) |
| ***B33Y 30/00*** | (2015.01) |
| ***B33Y 50/02*** | (2015.01) |
| *B29C 64/264* | (2017.01) |
| *B33Y 10/00* | (2015.01) |
| *B33Y 70/00* | (2020.01) |

(52) U.S. Cl.

CPC ............. *B29C 64/264* (2017.08); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | | |
|---|---|---|---|---|
| 2016/0129632 | A1 † | 5/2016 | Yamazaki | |
| 2017/0151726 | A1 * | 6/2017 | Ikeda | B29C 64/393 |
| 2018/0050489 | A1 * | 2/2018 | Okawa | B29C 64/112 |
| 2018/0056581 | A1 * | 3/2018 | Ochi | B29C 64/209 |
| 2018/0111311 | A1 * | 4/2018 | Ochi | B33Y 30/00 |
| 2018/0133979 | A1 * | 5/2018 | Okawa | H04N 1/52 |
| 2019/0217541 | A1 * | 7/2019 | Duro Royo | G05B 15/02 |
| 2019/0240914 | A1 * | 8/2019 | Kunio | B29C 64/393 |
| 2019/0270253 | A1 * | 9/2019 | Levi | B29C 64/336 |

FOREIGN PATENT DOCUMENTS

| | | | |
|---|---|---|---|
| JP | 2015186918 | 10/2015 | |
| JP | 2015202689 | 11/2015 | |
| JP | 2016064538 | 4/2016 | |
| JP | 2016147458 | 8/2016 | |
| JP | 2018030332 | 3/2018 | |
| JP | 2018043408 | 3/2018 | |
| JP | 2018065308 | 4/2018 | |
| JP | 2018184009 | 11/2018 | |
| JP | 2019209494 | 12/2019 | |
| WO | WO-2015199019 A1 * | 12/2015 | B29C 64/112 |
| WO | WO-2018079416 A1 * | 5/2018 | B29C 64/106 |
| WO | 2018234898 | 12/2018 | |
| WO | WO-2020250230 A1 * | 12/2020 | B29C 64/386 |

OTHER PUBLICATIONS

"International Search Report (Form PCT/ISA/210) of PCT/JP2020/046005", mailed on Mar. 9, 2021, with English translation thereof, pp. 1-11.

"Office Action of Japan Counterpart Application", issued on May 23, 2023, with English translation thereof, p. 1-p. 8.

"Office Action of Japan Counterpart Application" with English translation thereof, issued on Dec. 6, 2022, p. 1-p. 9.

"Office Action of Japan Counterpart Application" with English translation thereof, issued on Dec. 6, 2022, p. 1-p. 10.

* cited by examiner
† cited by third party (A)

(B)

MOLDING DEVICE, CLEAR INK COMPENSATION AMOUNT INPUT METHOD, AND MOLDING METHOD

CROSS-REFERENCE TO RELATED APPLICATION

This application is a 371 application of the International PCT application serial no. PCT/JP2020/046005, filed on Dec. 10, 2020, which claims the priority benefits of Japan Patent Application No. 2019-229023, filed on Dec. 19, 2019, and Japan Patent Application No. 2019-229025, filed on Dec. 19, 2019. The entirety of each of the above-mentioned patent applications is hereby incorporated by reference herein and made a part of this specification.

TECHNICAL FIELD

This invention relates to a molding device, a clear ink compensation amount input method, and a molding method.

BACKGROUND ART

In recent years, molding devices for forming three-dimensional objects have been widely spread. As such molding devices, devices have been developed that eject ink which is a material of a molded object using an inkjet head, cure the ejected ink with ultraviolet rays or the like to form a layer of the ink, and flatten the layer with a flattening roller to repeat layering to form a molded object.

Here, the amount of a color ink ejected from the inkjet head (hereinafter referred to as "ink amount") changes according to the color concentration, resulting in differences in the layering thickness according to the color concentration. For this reason, Patent Literature 1 discloses a molding device that ejects a clear ink so as to compensate for the difference in the amount of ink ejected. In general, the lighter the color (close to white), the larger the amount of the clear ink for compensation, and the darker the color, the smaller the amount of the clear ink for compensation.

Here, Patent Literature 2 discloses a molding device that forms a molded object through a multi-pass method. The multi-pass method is, for example, a method of performing a plurality of main scanning operations on each position and ejecting ink droplets to each position a plurality of times when forming one layer of ink. In this way, a higher-definition molded object can be formed.

CITATION LIST

Patent Literature

Patent Literature 1: Japanese Unexamined Patent Publication No. 2016-64538
Patent Literature 2: Japanese Unexamined Patent Publication No. 2018-184009

SUMMARY OF INVENTION

Technical Problems

In compensating the clear ink as disclosed in Patent Literature 1, it is preferable to calculate the compensation amount of the clear ink for each ejected color ink, but this is not realistic since calculating the compensation amount of the clear ink takes time and the total time required for forming a molded object becomes longer.

For this reason, under the current circumstances, a predetermined amount of the clear ink is uniformly ejected together with the color ink so as to satisfy a predetermined layering thickness regardless of the concentration of the color ink. However, the ink may be excessively layered depending on the concentration of the color ink. When excessive layering of the ink occurs, the excessive ink is dragged by the flattening roller and goes too far to a side portion of the molded object, the excessive ink adheres to the flattening roller and then adheres again to the molded object from the flattening roller, or the like when the flattening roller performs flattening, which may cause stains on the molded object.

Accordingly, this invention provides a molding device and a clear ink compensation amount input method capable of setting an appropriate compensation amount of a clear ink used for forming a molded object.

However, in ink dots formed by ink droplets ejected in the multi-pass method, the earlier the ink dots are formed, the more repeatedly they are irradiated with ultraviolet rays or the like, causing a possibility of being overcured. When the ink dot is overcured, a warp may occur in the molded object or the strength and color tone may be affected. Further, when the flattening roller performs flattening, shavings at the overcured part may adhere to the molded object again and become stains on the molded object.

Accordingly, this invention provides a molding device and a molding method capable of suppressing overcuring of an ink dot formed by an ink droplet ejected earlier when forming a molded object through a multi-pass method.

Solutions to Problems

A molding device of this invention is provided with a first ejection means that ejects a color ink and a second ejection means that ejects a clear ink. The color ink is ejected from the first ejection means and layered to color and form a molded object, and the clear ink is ejected from the second ejection means to compensate a layering amount of the color ink. The molding device includes an input means that inputs a compensation amount of the clear ink such that an impact frequency of the clear ink becomes low at a place where an impact frequency of the color ink in coloring and forming the molded object is high, and the impact frequency of the clear ink becomes high at a place where the impact frequency of the color ink is low for each layer forming the molded object.

With this configuration, an operator of the molding device can set the amount of the clear ink for compensation according to the impact frequency of the color ink in each layer in coloring and forming the molded object. In this way, it is possible to eject a more appropriate amount of the clear ink according to the impact frequency of the color ink as compared with the case of uniformly ejecting a predetermined amount of the clear ink for compensation for the molded object. In other words, with this configuration, the compensation amount of the clear ink used for forming the molded object can be adjusted to an appropriate amount.

In the molding device of this invention, the impact frequency of the color ink corresponds to a color concentration of a color image for coloring the molded object, and the compensation amount of the clear ink may be input by the input means such that the impact frequency of the clear ink becomes low at a place where the color concentration is high, and the impact frequency of the clear ink becomes high at a place where the color concentration is low in the color image. With this configuration, the operator can more appropriately input the compensation amount of the clear ink.

In the molding device of this invention, the compensation amount of the clear ink may be input such that a thickness of each layer forming the molded object stays constant. With this configuration, the operator can set the compensation amount of the clear ink without affecting the shape of the molded object.

In the molding device of this invention, the input means may be provided in an information processing unit including a display on which a color image for coloring the molded object is displayed. With this configuration, the operator can more easily input the compensation amount of the clear ink.

In the molding device of this invention, the compensation amount of the clear ink may be input for each of a plurality of regions obtained by virtually dividing the molded object. With this configuration, the operator can more appropriately input the compensation amount of the clear ink.

The molding device of this invention may include a calculation means that calculates a reference value of the compensation amount of the clear ink corresponding to a color concentration of a color image for coloring the molded object, and the reference value calculated by the calculation means may be displayed on a display. With this configuration, the operator can more appropriately input the compensation amount of the clear ink.

A molding device of this invention is provided with a first ejection means that ejects a color ink and a second ejection means that ejects a clear ink. The color ink is ejected from the first ejection means and layered to color and form a molded object, and the clear ink is ejected from the second ejection means to compensate a layering amount of the color ink. In the molding device, a maximum value of an ejection amount of the clear ink is predetermined for each position in each layer forming the molded object, and the molding device includes an input means that inputs a compensation amount of the clear ink such that the ejection amount of the clear ink approaches the maximum value in a part where a color concentration of a color image for coloring the molded object is relatively lower. With this configuration, the compensation amount of the clear ink used for forming the molded object can be set to an appropriate amount.

A clear ink compensation amount input method of this invention is a clear ink compensation amount input method of a molding device provided with a first ejection means that ejects a color ink and a second ejection means that ejects a clear ink. The color ink is ejected from the first ejection means and layered to color and form a molded object, and the clear ink is ejected from the second ejection means to compensate a layering amount of the color ink. The method includes a first step of displaying a color image for coloring the molded object on a display, and a second step of inputting a compensation amount of the clear ink such that an impact frequency of the clear ink becomes low at a place where an impact frequency of the color ink in coloring and forming the molded object is high, and the impact frequency of the clear ink becomes high at a place where the impact frequency of the color ink is low for each layer forming the molded object.

A molding device of this invention includes an inkjet head that ejects an ink droplet of a curable ink which cures under a light with a predetermined wavelength, and a light source that irradiates an ink dot formed by the impacted ink droplet with the light. In the molding device, the ink dots are layered to form a molded object. The inkjet head forms the molded object through a multi-pass method in which a plurality of main scanning operations of ejecting the ink droplet are performed while the inkjet head moves in a predetermined main scanning direction on each position in a region to be molded where the molded object is formed, and an illuminance of the light emitted from the light source is decreased in earlier main scanning operations among the plurality of main scanning operations on each position.

With this configuration, when forming the molded object through the multi-pass method, a cumulative light quantity of the light for curing the ink dot formed by the ink droplet ejected earlier can be suppressed, and therefore, overcuring of the ink dot formed earlier can be suppressed.

In the molding device of this invention, the illuminance of the light emitted from the light source may be increased gradually such that an illuminance of the light emitted to the ink dot first is increased as the ink dot is formed later at each position. With this configuration, overcuring of the ink dot formed earlier can be suppressed.

In a molding device of this invention, an illuminance of the light emitted from the light source to the ink dot formed last at each position may be set as an illuminance at which the ink dot is completely cured, and an illuminance of the light emitted from the light source to the ink dot formed before the last may be set as an illuminance at which the ink dot is not completely cured by only one irradiation. With this configuration, overcuring of the ink dot formed earlier can be suppressed.

In the molding device of this invention, the light source may emit the light such that cumulative light quantities for a plurality of the ink dots formed at each position are made equal. With this configuration, the degrees of curing of the plurality of ink dots formed at each position on a molding table can be made equal.

A molding method of this invention includes a first step of ejecting an ink droplet of a curable ink which cures under a light with a predetermined wavelength by an inkjet head, and a second step of irradiating an ink dot formed by the impacted ink droplet with the light by a light source. In the molding method, the first step and the second step are repeated and layer the ink dots to form a molded object. The inkjet head forms the molded object through a multi-pass method in which a plurality of main scanning operations of ejecting the ink droplet are performed while the inkjet head moves in a predetermined main scanning direction on each position in a region to be molded where the molded object is formed, and an illuminance of the light emitted from the light source is decreased in earlier main scanning operations among the plurality of main scanning operations on each position.

Effect of the Invention

With this invention, the compensation amount of a clear ink used for forming a molded object can be set to an appropriate amount.

With this invention, overcuring of an ink dot formed by an ink droplet ejected earlier can be suppressed when forming a molded object through a multi-pass method.

DESCRIPTION OF EMBODIMENTS

Hereinafter, a molding method and a molding device of an embodiment of this invention will be described with reference to the drawings.

First Embodiment

Figure 1:
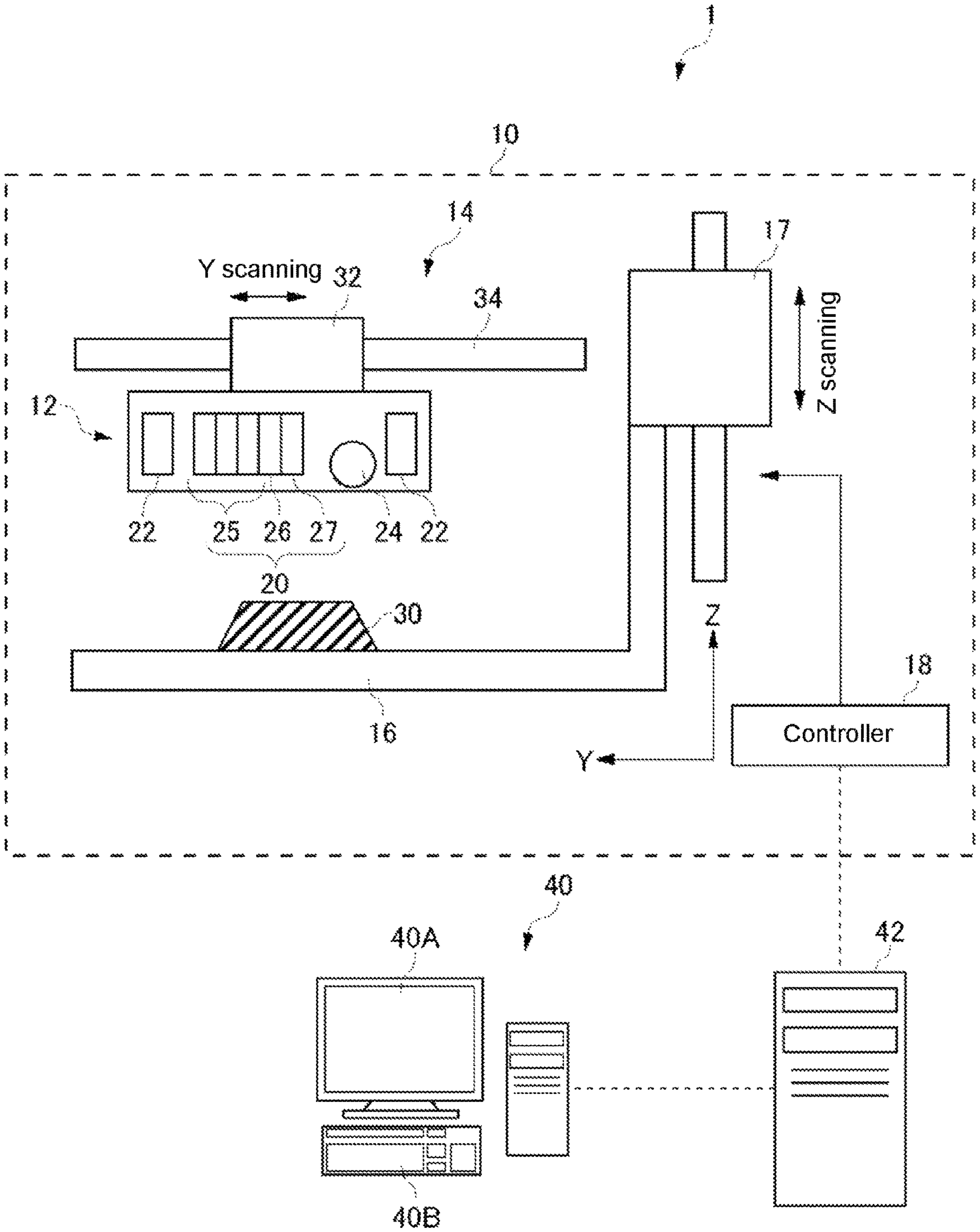
FIG. 1 is a schematic configuration diagram of a molding system of a first embodiment.

FIG. 1 is a diagram illustrating a configuration of a molding device 1 of this embodiment. As an example, the molding device 1 is configured as a system including a 3D printer 10, a user PC 40, and a control PC 42.

The 3D printer 10 of this embodiment is an inkjet 3D printer that includes an ejection unit 12, a scanning driving unit 14, a molding table 16, a movable unit 17, and a control unit 18, and forms a three-dimensional molded object 30 by solidifying with ultraviolet rays and layering ultraviolet curable resins ejected from the ejection unit 12.

The ejection unit 12 ejects a material of the molded object 30, and forms the molded object 30 on the molding table 16 by stacking layers constituting the molded object 30 one by one. More specifically, the ejection unit 12 includes an inkjet head 20 that ejects various types of ink, an ultraviolet light source 22 that cures the ejected ink, and a flattening roller 24 that flattens a layering surface of a curable resin formed while the molded object 30 is molded.

The inkjet head 20 of this embodiment includes a color inkjet head 25 as a first ejection means that ejects a color ink, a clear inkjet head 26 as a second ejection means that ejects a clear ink, and a support material head 27 that ejects a support material. Note that in FIG. 1, three color inkjet heads 25 are shown, but the number of color inkjet heads 25 can be set to an appropriate number according to the number of types of ink to be used.

The ejection unit 12, for example, ejects an ink droplet or the like of a curable resin that cures by irradiation of the ultraviolet rays and cures the ink droplet to form each layer constituting the molded object 30. Specifically, the ejection unit 12, for example, repeatedly performs a layer forming operation of forming a layer of the curable resin and a curing operation of curing the layer of the curable resin formed in the layer forming operation a plurality of times by ejecting the ink droplet according to an instruction of the control unit 18. In this way, the ejection unit 12 stacks a plurality of cured layers of the curable resin and forms the layers. Note that the 3D printer 10 is not limited to using the ultraviolet curable resin and may employ a method of layering thermoplastic curable resins which are ejected from the ejection unit 12 in a high temperature state, cooled to room temperature, and cured.

The molding device 1 ejects the color ink from the color inkjet head 25 and layers the color ink to color and form the molded object 30, but the amount of the color ink ejected from the color inkjet head 25 (hereinafter referred to as "color ink amount") changes according to the concentration of the color (hereinafter referred to as "color concentration"). Accordingly, the molding device 1 ejects the clear ink from the clear inkjet head 26 to compensate the layering amount of the color ink.

The scanning driving unit 14 is a driving unit that relatively moves (hereinafter referred to as "scanning operation") the ejection unit 12 with respect to the molded object 30. The scanning driving unit 14 causes the ejection unit 12 to perform a main scanning operation (Y scanning) and a sub scanning operation (X scanning) as scanning operations. Here, the main scanning operation is, for example, an operation in which the ejection unit 12 ejects the ink droplet while moving in a preset main scanning direction (Y direction in the figure).

The scanning driving unit 14 includes a carriage 32 and a guide rail 34. The carriage 32 is a holding portion that holds the ejection unit 12 to face the molding table 16. In other words, the carriage 32 holds the ejection unit 12 such that the ejection direction of the ink droplet is a direction toward the molding table 16. Further, during the main scanning operation, the carriage 32 moves along the guide rail 34 while holding the ejection unit 12. The guide rail 34 is a rail-shaped member that guides the movement of the carriage 32, and moves the carriage 32 according to an instruction of the control unit 18 during the main scanning operation.

Note that the movement of the ejection unit 12 in the main scanning operation may be a relative movement with respect to the molded object 30. For example, the position of the ejection unit 12 may be fixed and the molded object 30 may be moved by moving the molding table 16.

The movable unit 17 is a conveyance mechanism that changes a distance between the ejection unit 12 and the molding table 16. An upper surface of the molding table 16 of this embodiment is moved in the vertical direction (Z direction in FIG. 1) by the movable unit 17. The upper surface of the molding table 16 moves in accordance with the progress of molding of the molded object 30 under an instruction of the control unit 18. In this way, a distance (gap) between a surface to be molded in the molded object 30 in the middle of molding and the ejection unit 12 is appropriately adjusted. Here, the surface to be molded of the molded object 30 is, for example, a surface on which the next layer is formed by the ejection unit 12. Note that the adjustment of the distance between the ejection unit 12 and the molding table 16 may be performed by moving an ejection unit 12 side up and down.

The control unit 18 is, for example, a central processing unit (CPU) of the 3D printer 10, and controls each unit of the 3D printer 10 based on slice data indicating shape information, color image information, and the like of the molded object 30 to be molded to control an operation of molding of the molded 30.

The user PC 40 is an information processing unit including a display 40A and an input part 40B that includes a keyboard, a mouse, and the like. The user PC 40 of this embodiment transmits 3D model data indicating the molded object 30 in a predetermined format as a molding job to the control PC 42. The 3D model data is data indicating the shape, the surface color, and the like of the molded object 30, and is created based on, for example, 3D CAD data, data of an appearance obtained by photographing the molded object 30 to be manufactured, and the like.

An operator of the molding device 1 inputs the compensation amount of the clear ink which will be described in detail later through the input part 40B.

The control PC 42 is an information processing unit that controls the 3D printer 10, and receives the molding job from the user PC 40. The control PC 42 generates slice data corresponding to a cross section of each position of the molded object 30 based on the molding job (3D model data) received from the user PC 40. Subsequently, the control PC 42 transmits the slice data corresponding to each position to the 3D printer 10. In the example of FIG. 1, one 3D printer 10 is connected to the control PC 42, which is just one example, and a plurality of 3D printers 10 may be connected to the control PC 42.

Note that the user PC 40 and the control PC 42 include, for example, a CPU that performs arithmetic processing and a storage unit such as a read only memory (ROM) that stores programs and various data in advance, a random access memory (RAM) used as a work area of the CPU, and a hard disk drive (HDD) that stores various information, and transmit and receive various data to and from another information processing unit or the 3D printer 10.

Figure 2:
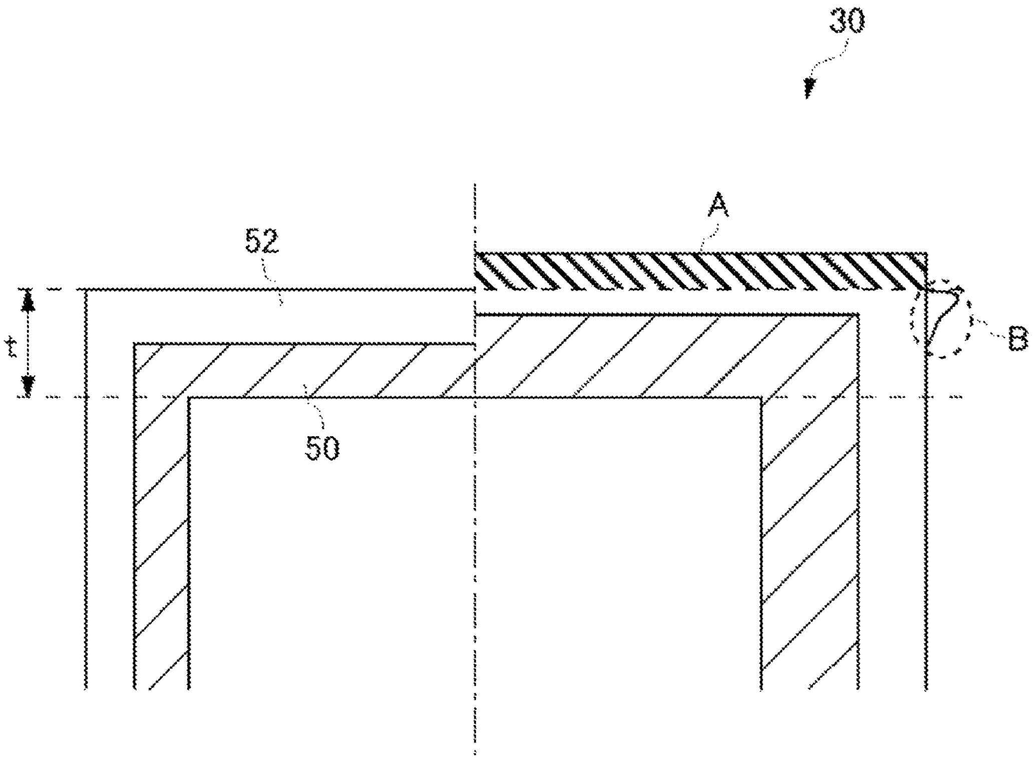
FIG. 2 is a schematic view illustrating a compensation state of a clear ink.

Next, the compensation of the clear ink will be described with reference to the schematic view of FIG. 2. In FIG. 2, reference numeral 50 denotes a color ink layer, and reference numeral 52 denotes a clear ink layer. Further, the left side of FIG. 2 shows an appropriate compensation state of the clear ink, and the right side of FIG. 2 shows a state where the clear ink is excessively compensated.

In forming the molded object 30, the impact frequency of the color ink becomes relatively low with respect to a layer having a low color concentration. Therefore, in order for each layer forming the molded object 30 to have a predetermined reference thickness t, a predetermined amount of the clear ink is uniformly ejected to each layer formed by the color ink layer 50 to form the clear ink layer 52. Note that each layer formed by the color ink layer 50 and the clear ink layer 52 is cured by the ultraviolet light source 22, and then the layering surface is flattened by the flattening roller 24.

Here, as illustrated on the right side of FIG. 2, when the predetermined amount of the clear ink is further ejected to a thick color ink layer 50 having a high color concentration, the layering thickness of the ink may exceed the reference thickness t, resulting in excessive layering. When excessive layering of the ink occurs, a part of the excessive ink (ink indicated by hatching A in FIG. 2) is not removed and is dragged by the flattening roller 24 and then goes too far to a side portion of the molded object 30 (region B in FIG. 2), the excessive ink adhered to the flattening roller 24 and then a part thereof adheres again to the molded object 30 from the flattening roller 24, or the like when the flattening roller 24 performs flattening, which may cause stains on the molded object 30.

Therefore, in the molding device 1 of this embodiment, the operator inputs the compensation amount of the clear ink using the input part 40B provided in the user PC 40 such that the impact frequency of the clear ink becomes low at a place where the impact frequency of the color ink in coloring and forming the molded object 30 is high, and the impact frequency of the clear ink becomes high at a place where the impact frequency of the color ink is low for each layer forming the molded object 30.

Note that the impact frequency of the color ink corresponds to the color concentration of a color image for coloring the molded object 30. Therefore, in the molding device 1 of this embodiment, the operator inputs the compensation amount of the clear ink using the input part 40B such that the impact frequency of the clear ink becomes low at a place where the color concentration of the color image is high, and the impact frequency of the clear ink becomes high at a place where the color concentration is low.

In addition, the user PC 40 of this embodiment displays the color image formed as the molded object 30 on the display 40A. Accordingly, the operator of the 3D printer 10 can confirm the color image, and the compensation amount of the clear ink is input such that the thickness of each layer forming the molded object 30 stays constant.

With such a configuration, the operator of the 3D printer 10 can input an appropriate compensation amount of the clear ink based on his/her own experience, and the compensation amount of the clear ink used for forming the molded object 30 can be set to an appropriate amount.

Figure 3:
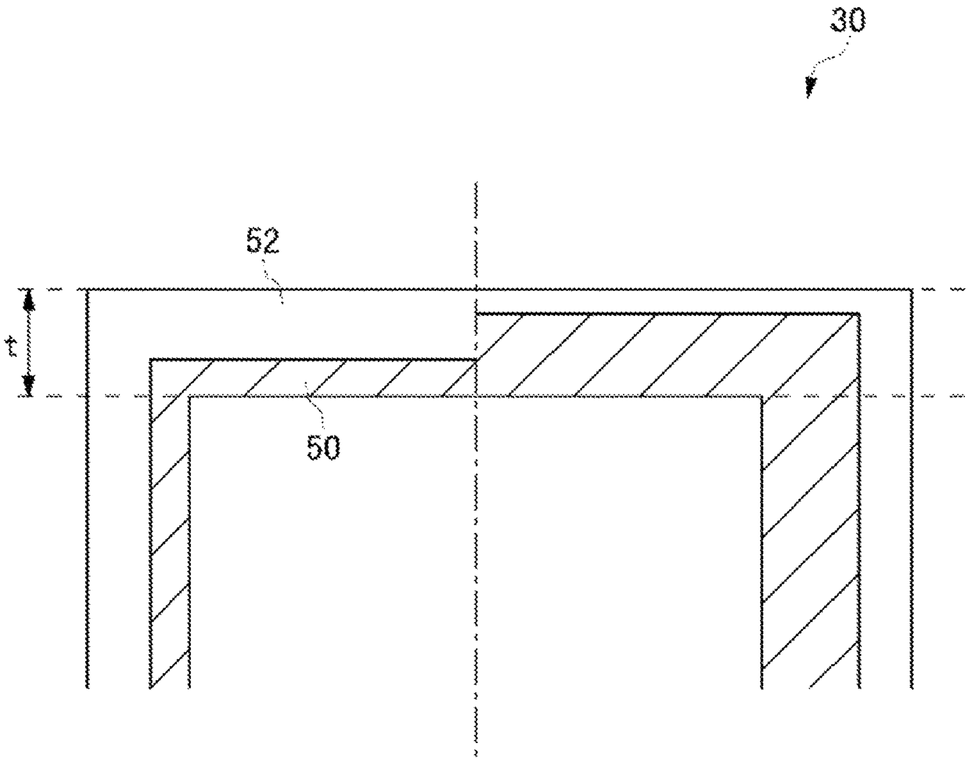
FIG. 3 is a schematic view illustrating a compensation state of a clear ink of the first embodiment.

Further, in the molded object 30 formed by the molding device 1 of this embodiment, as shown on the right side of FIG. 3, the layer is formed such that the clear ink layer 52 becomes relatively thin when the color ink layer 50 is thick, that is, the impact frequency of the clear ink becomes low at a place where the impact frequency of the color ink is high. On the other hand, as shown on the left side of FIG. 3, the layer is formed such that the clear ink layer 52 becomes relatively thick when the color ink layer 50 is thin, that is, the impact frequency of the clear ink becomes high at a place where the impact frequency of the color ink is low. Accordingly, the excessive layering of the ink can be suppressed, and the occurrence of stains on the molded object 30 can also be suppressed.

In other words, with the molding device 1 of this embodiment, the operator can set the amount of the clear ink for compensation according to the impact frequency of the color ink in each layer that colors and forms the molded object 30. In this way, it is possible to eject a more appropriate amount of the clear ink according to the impact frequency of the color ink as compared with the case of uniformly ejecting a predetermined amount of the clear ink for compensation for the molded object 30. In other words, with the molding device 1 of this embodiment, the compensation amount of the clear ink used for forming the molded object 30 can be adjusted to an appropriate amount. Further, since the compensation amount of the clear ink is input by the operator, a process of calculating the compensation amount of the clear ink for each layer forming the molded object 30 is not necessary, and the time required for molding the molded object 30 is shortened.

Figure 4:
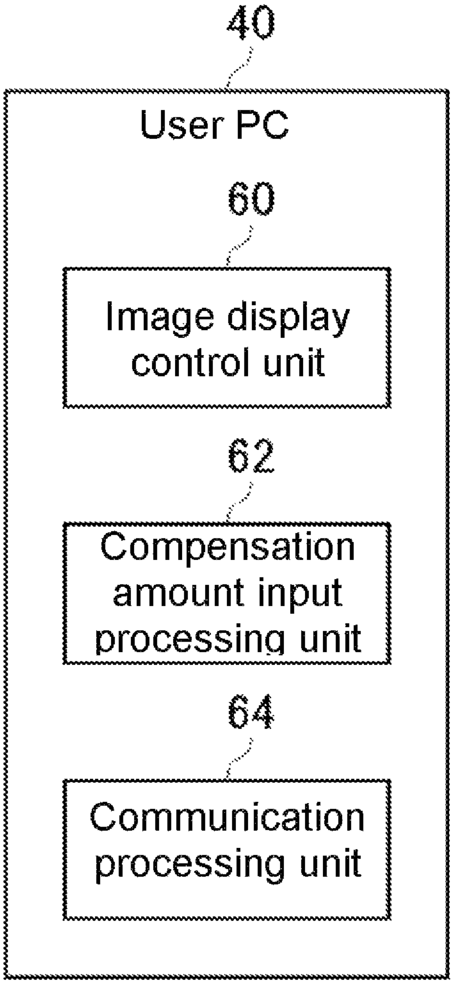
FIG. 4 is a functional block diagram related to a clear ink compensation input function of the first embodiment.

FIG. 4 is a functional block diagram related to a clear ink compensation input function that the user PC 40 of this embodiment has. The clear ink compensation input function is executed by the CPU provided in the user PC 40.

The user PC 40 includes an image display control unit 60, a compensation amount input processing unit 62, and a communication processing unit 64.

The image display control unit 60 controls the display 40A to display an image based on image data. As an example, the user PC 40 of this embodiment causes the image display control unit 60 to display a color image showing the molded object 30 and a predetermined image for inputting the compensation amount of the clear ink. Note that the color image is generated based on 3D model data indicating the molded object 30 formed by the 3D printer 10.

The compensation amount input processing unit 62 receives the compensation amount of the clear ink which is input through the input part 40B, and stores the input compensation amount as a setting value (hereinafter referred to as "compensation amount setting value") in the storage unit such as a RAM. Note that as an example, the compensation amount of the clear ink may be input as an arbitrary numerical value, but is not limited thereto. One of options divided into a plurality of stages from a state where the compensation amount of the clear ink is small to a state where the compensation amount of the clear ink is large may be input. Examples of the options divided into the plurality of stages include associating the compensation amount of the clear ink with each numerical value from "1" to "5" in advance and increasing the compensation amount of the clear ink as the numerical value increases.

Further, the compensation amount of the clear ink may be one value for one molded object 30, and the compensation amount of the clear ink may be input for each of a plurality of regions obtained by virtually dividing the molded object 30 (hereinafter referred to as "virtually divided regions").

The virtually divided regions may be designated, for example, by the operator selecting an arbitrary region for the color image displayed on the display 40A, or may be derived by the compensation amount input processing unit 62. In this case, the compensation amount input processing unit 62 may derive the virtually divided regions, for example, by dividing the molded object 30 shown in the color image at predetermined intervals from a predetermined direction, based on the color concentration in the color image, or based on the shape of the molded object 30.

The communication processing unit 64 performs a process related to transmission and reception of data with another information processing unit such as the control PC 42. The communication processing unit 64 of this embodiment performs a process of transmitting a molding job and a compensation amount setting value based on the 3D model data to the control PC 42.

Figure 5:
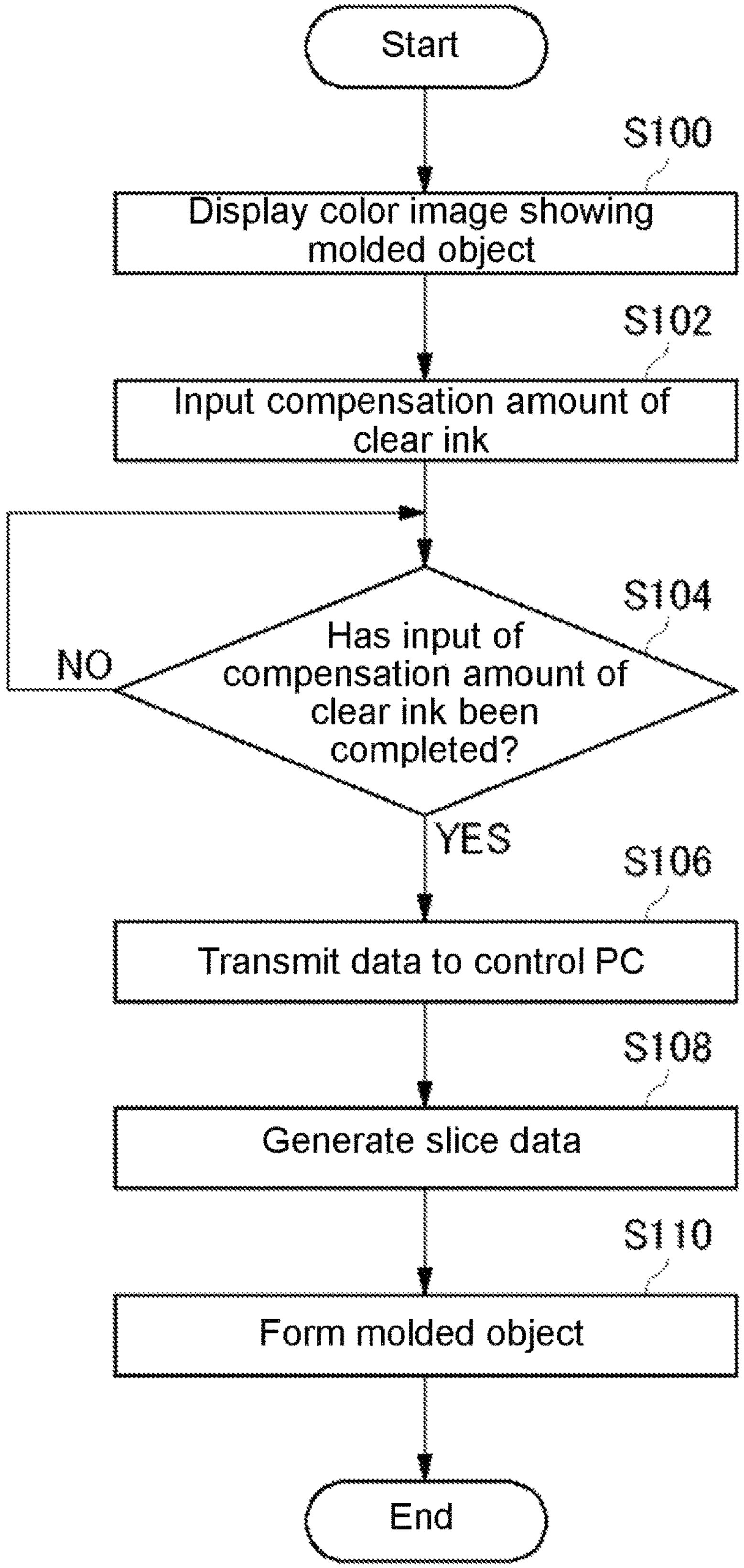
FIG. 5 is a flowchart illustrating a flow of a molding process of the first embodiment.

FIG. 5 is a flowchart illustrating a flow of a molding process executed by the molding device 1 of this embodiment. Note that this molding process is started when software (application) for executing the molding process is started in the user PC 40.

First, in step 100, the operator selects the 3D model data indicating the molded object 30 created by the 3D printer 10, and the display 40A of the user PC 40 displays the color image showing the molded object 30.

In the next step 102, the operator inputs the compensation amount of the clear ink through the input part 40B of the user PC 40 while referring to the color image, and the compensation amount input processing unit 62 receives the input.

In the next step 104, the compensation amount input processing unit 62 determines whether or not the input of the compensation amount of the clear ink has been completed. If YES, the process proceeds to step 106, and if NO, the process enters a standby state. Note that as an example, it may be determined that the input of the compensation amount of the clear ink has been completed when a predetermined image displayed on the display 40A (for example, an image instructing data transmission to the control PC 42) is clicked.

In step 106, the communication processing unit 64 performs a process of transmitting the 3D model data and the compensation amount setting value as the molding job to the control PC 42.

In the next step 108, the control PC 42 generates slice data based on the 3D model data and transmits the compensation amount setting value to the 3D printer 10 together with the slice data.

In the next step 110, the 3D printer 10 forms the molded object 30 based on the slice data and the compensation amount setting value.

Second Embodiment

Figure 6:
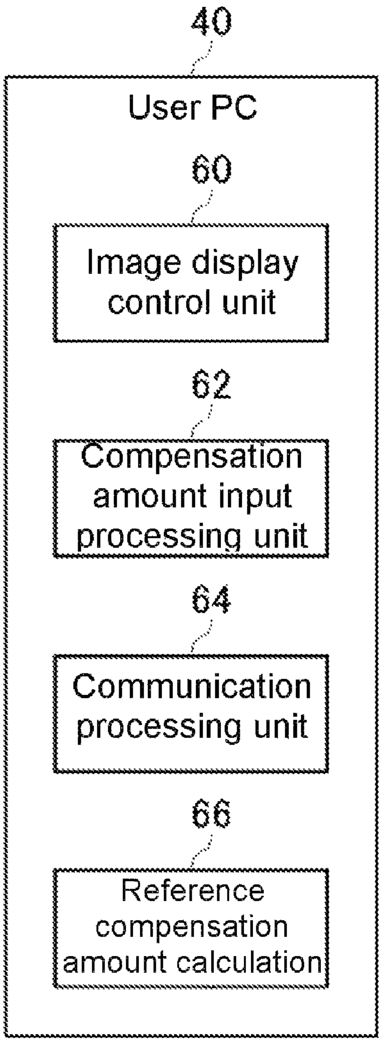
FIG. 6 is a functional block diagram related to a clear ink compensation input function of a second embodiment.

Hereinafter, a second embodiment of this invention will be described. Note that a configuration of a molding device 1 of this embodiment is similar to the configuration of the molding device 1 illustrated in FIG. 1, and thus the description thereof will be omitted. FIG. 6 is a functional block diagram related to a clear ink compensation input function that a user PC 40 of this embodiment has. Note that the same components in FIG. 6 as those in FIG. 4 are denoted by the same reference numerals as those in FIG. 4, and the description thereof will be omitted.

The user PC 40 of this embodiment includes an image display control unit 60, a compensation amount input processing unit 62, a communication processing unit 64, and a reference compensation amount calculation unit 66.

The reference compensation amount calculation unit 66 calculates a reference value of the compensation amount of a clear ink corresponding to the color concentration of a color image for coloring a molded object 30. Specifically, the reference compensation amount calculation unit 66 calculates the thickness of a color ink corresponding to the color concentration, and calculates the reference value of the compensation amount of the clear ink by subtracting the thickness of the color ink from the reference thickness t. Note that one reference value may be calculated for the entire molded object 30, or the reference value may be calculated for each virtually divided region. Further, the reference value is a value corresponding to an input mode of the compensation amount. For example, when the compensation amount is input by selecting any of options "1" to "5", the reference value is also indicated by any of "1" to "5".

The reference value calculated by the reference compensation amount calculation unit 66 is displayed on a display 40A by the image display control unit 60. In this way, an operator can more easily input the compensation amount of the clear ink such that the thickness of each layer forming the molded object 30 stays constant.

Further, when the operator inputs a compensation amount different from the reference value by a predetermined value or more, a warning may be displayed. In this way, the compensation amount of the clear ink can be prevented from becoming too large or too small.

Third Embodiment

Hereinafter, a third embodiment of this invention will be described. Note that a configuration of a molding device 1 of this embodiment is similar to the configuration of the molding device 1 illustrated in FIG. 1, and thus the description thereof will be omitted. In the molding device 1 of this embodiment, the maximum value of the ejection amount of a clear ink is predetermined for each layer forming a molded object 30, and the compensation amount of the clear ink is input by an operator such that the ejection amount of the clear ink approaches the maximum value in a part where the color concentration of a color image for coloring the molded object 30 is relatively lower.

More specifically, the maximum value is set for the ejection amount of the clear ink, and this maximum value is the same amount as the maximum amount of a color ink in one ejection. Regardless of the color concentration of the color image, when the clear ink is ejected at this maximum value as the compensation amount of the clear ink, the compensation amount of the clear ink can be prevented from becoming insufficient even in a part having the lowest color concentration. However, regardless of the level of the color concentration, when the same amount of the clear ink as the maximum amount of the color ink is always compensated, the compensation amount of the clear ink added may be excessive.

Therefore, in this embodiment, the maximum value of the compensation amount of the clear ink is set to 100%, and input is performed such that the compensation amount of the clear ink approaches 100% as the color concentration of the color image is lower. In other words, the maximum value 100% of the compensation amount of the clear ink is set as a reference value, and input is performed by the operator such that the compensation amount of the clear ink is decreased as the color concentration is higher.

Figure 7:
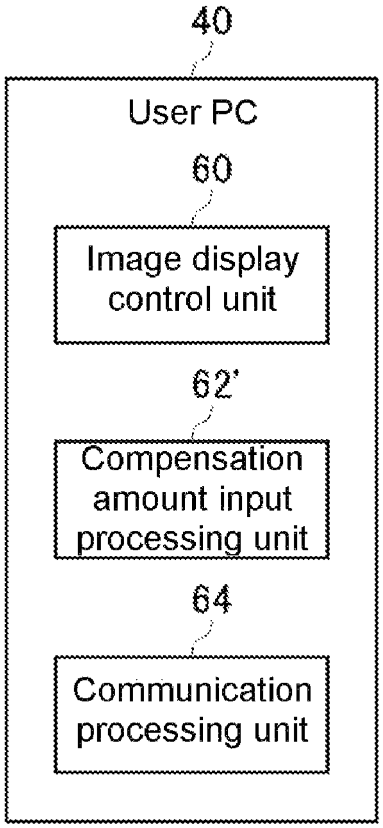
FIG. 7 is a functional block diagram related to a clear ink compensation input function of a third embodiment.

FIG. 7 is a functional block diagram related to a clear ink compensation input function that a user PC 40 of this embodiment has. Note that the same components in FIG. 7 as those in FIG. 4 are denoted by the same reference numerals as those in FIG. 4, and the description thereof will be omitted.

A compensation amount input processing unit 62' stores a compensation amount setting value of the clear ink input through an input part 40B in a storage means such as a RAM. In this embodiment, the maximum value of the compensation amount of the clear ink is set to 100%, and input of the compensation amount that approaches 100% as the color concentration is lower is received.

More specifically, the color image showing the molded object 30 is displayed on a display 40A of the user PC 40, and the operator inputs a numerical value between 100% and a predetermined lower limit value (for example, 50%) as the compensation amount of the clear ink through the input part 40B of the user PC 40 while referring to the color image. As the input value, a stepwise value, for example, "large", "medium", and "small", may be selected and input instead of the percentage. As an example, when "large" is selected, the compensation amount setting value may be 100%, when "medium" is selected, the compensation amount setting value may be 75%, and when "small" is selected, the compensation amount setting value may be 50%.

As described above, while this invention has been described using the above embodiments, the technical scope of this invention is not limited to the range described in the above embodiments. Various modifications or improvements can be made to the above embodiments without departing from the gist of the invention, and a mode in which the modifications or improvements are made is also included in the technical scope of this invention. In addition, the above embodiments may be appropriately combined.

In the above embodiments, a mode in which the molding device 1 is configured as a system including the 3D printer 10, the user PC 40, and the control PC 42 has been described, but this invention is not limited thereto. For example, an information processing unit having functions of the user PC 40 and the control PC 42 may be connected to the 3D printer 10. Further, the 3D printer 10 may include a display 40A and an input part 40B, the color image for coloring the molded object 30 may be displayed on the display 40A, and the operator may input the compensation amount of the clear ink through the input part 40B.

Effects of Embodiments (1) The molding device 1 of each embodiment above includes the color inkjet head 25 that ejects the color ink and the clear inkjet head 26 that ejects the clear ink. The color ink is ejected from the color inkjet head 25 and layered to color and form the molded object 30, and the clear ink is ejected from the clear inkjet head 26 to compensate the layering amount of the color ink. The molding device 1 includes the input part 40B through which the operator inputs the compensation amount of the clear ink such that the impact frequency of the clear ink becomes low at a place where the impact frequency of the color ink in coloring and forming the molded object 30 is high, and the impact frequency of the clear ink becomes high at a place where the impact frequency of the color ink is low for each layer forming the molded object 30.

With this configuration, the operator of the molding device 1 can set the amount of the clear ink for compensation according to the impact frequency of the color ink in each layer coloring and forming the molded object 30. In this way, it is possible to eject a more appropriate amount of the clear ink according to the impact frequency of the color ink as compared with the case of uniformly ejecting a predetermined amount of the clear ink for compensation for the molded object 30. In other words, with each embodiment above, the compensation amount of the clear ink used for forming the molded object 30 can be adjusted to an appropriate amount.

(2) In the molding device 1 of each embodiment above, the impact frequency of the color ink corresponds to the color concentration of the color image for coloring the molded object 30, and the operator inputs the compensation amount of the clear ink using the input part 40B such that the impact frequency of the clear ink becomes low at a place where the color concentration is high, and the impact frequency of the clear ink becomes high at a place where the color concentration is low in the color image. With each embodiment above, the operator can more appropriately input the compensation amount of clear ink.

(3) In the molding device 1 of each embodiment above, the operator inputs the compensation amount of the clear ink such that the thickness of each layer forming the molded object 30 stays constant. With each embodiment above, the compensation amount of the clear ink can be set without affecting the shape of the molded object 30.

(4) In the molding device 1 of each embodiment above, the input part 40B is provided in the user PC 40 including the display 40A on which the color image for coloring the molded object 30 is displayed. With each embodiment above, the operator can easily input the compensation amount of the clear ink.

(5) In the molding device 1 of each embodiment above, the compensation amount of the clear ink may be input for each of a plurality of regions obtained by virtually dividing the molded object 30. In this way, the operator can more appropriately input the compensation amount of the clear ink.

(6) The molding device 1 of the second embodiment includes the reference compensation amount calculation unit 66 that calculates a reference value of the compensation amount of the clear ink corresponding to the color concentration of the color image for coloring the molded object 30, and the reference value calculated by the reference compensation amount calculation unit 66 is displayed on the display 40A. With the second embodiment, the operator can more appropriately input the compensation amount of the clear ink.

(7) In the molding device 1 of the third embodiment, the maximum value of the ejection amount of the clear ink is predetermined for each position in each layer forming the molded object 30. The molding device 1 includes the input part 40B through which the operator inputs the compensation amount of the clear ink such that the ejection amount of the clear ink approaches the maximum value in a portion where the color concentration of the color image for coloring the molded object 30 is relatively lower.

Figure 8:
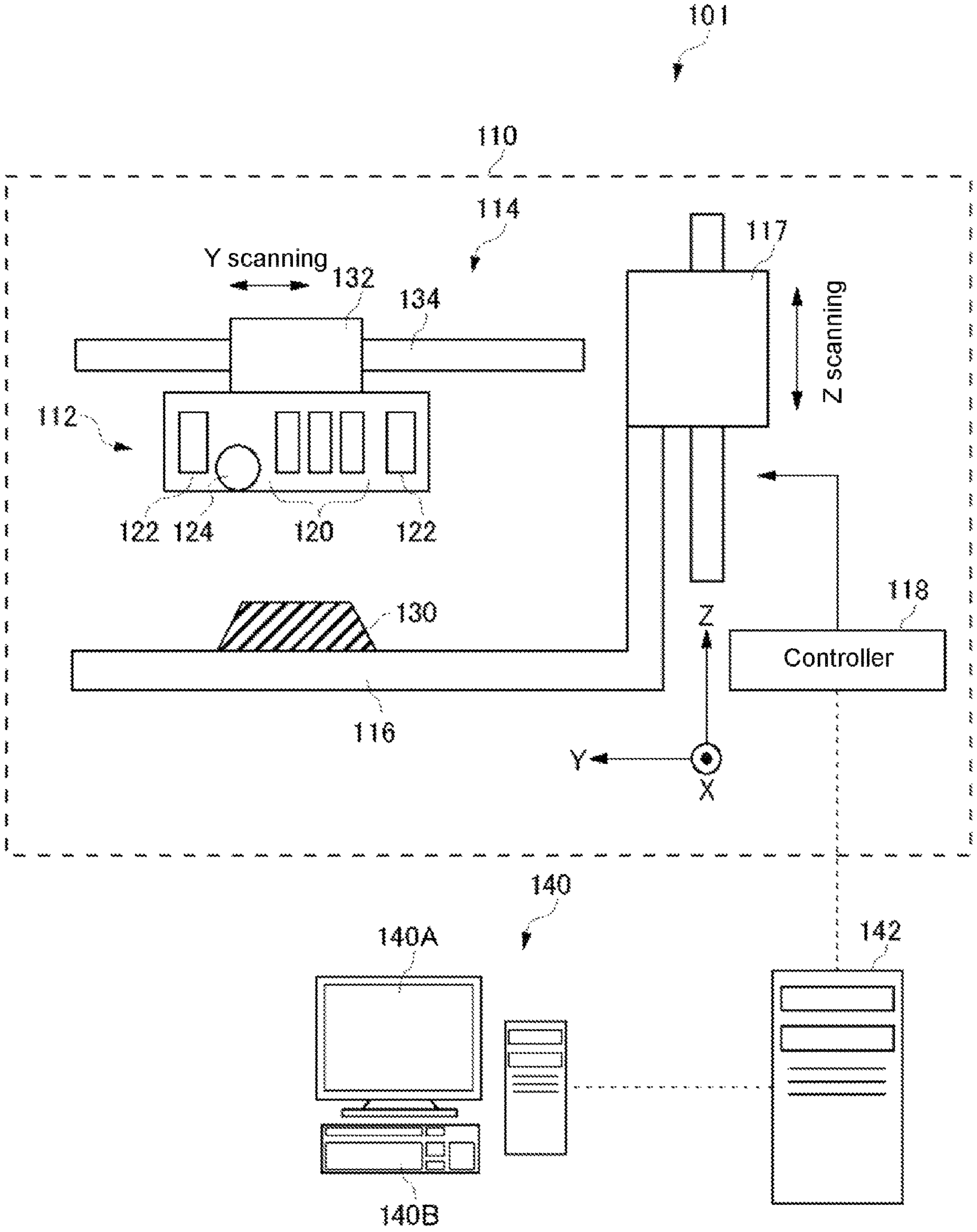
FIG. 8 is a schematic configuration diagram of a molding device of an embodiment.

Hereinafter, a molding method and a molding device of an embodiment of this invention will be described with reference to the drawings. FIG. 8 is a diagram illustrating a configuration of a molding device 101 of this embodiment. As an example, the molding device 101 is configured as a system including a 3D printer 110, a user PC 140, and a control PC 142.

The 3D printer 110 of this embodiment is an inkjet 3D printer that includes an ejection unit 112, a scanning driving unit 114, a molding table 116, a movable unit 117, and a controller 118, and forms a three-dimensional molded object 130 by solidifying and layering curable resins ejected from the ejection unit 112.

The ejection unit 112 ejects a material of the molded object 130, and forms the molded object 130 on the molding table 116 by stacking layers constituting the molded object 130 one by one. More specifically, the ejection unit 112 includes an inkjet head 120 that ejects an ink droplet containing various types of ink and a support material as the material of the molded object 130 toward the molding table 116, a left side light source 122 and a right side light source 122 that irradiate an ink dot formed by the ink droplet impacting on the molding table 116 with a light with a predetermined wavelength to cure the ink dot, and a flattening roller 124 that flattens an upper surface of the ink dot formed while the molded object 130 is molded (hereinafter referred to as "layering surface"). In the example of FIG. 8, three inkjet heads 120 are shown, but the number of inkjet heads 120 can be set to an appropriate number according to the number of types of ink to be used.

The light having a predetermined wavelength emitted from the light source 122 to the ink dot is, for example, ultraviolet rays. In other words, the ink droplet ejected from the inkjet head 120 is a curable ink (curable resin) that cures under ultraviolet rays.

In this way, the ejection unit 112 of this embodiment ejects an ink droplet or the like of a curable resin that cures by irradiation of the ultraviolet rays and cures the ink droplet to form each layer constituting the molded object 130. Specifically, the ejection unit 112 repeatedly performs a layer forming operation of forming a layer of the curable resin and a curing operation of curing the layer of the curable resin formed in the layer forming operation a plurality of times by ejecting the ink droplet according to an instruction of the controller 118 to form a molded object 130.

The scanning driving unit 114 is a driving unit that relatively moves (hereinafter referred to as "scanning operation") the ejection unit 112 with respect to the molded object 130. The scanning driving unit 114 causes the ejection unit 112 to perform a main scanning operation (Y scanning) and a sub scanning operation (X scanning). Here, the main scanning operation is, for example, an operation in which the ejection unit 112 ejects the ink droplet while reciprocating in a preset main scanning direction (Y direction in the figure).

The scanning driving unit 114 includes a carriage 132 and a guide rail 134. The carriage 132 is a holding portion that holds the ejection unit 112 to face the molding table 116. In other words, the carriage 132 holds the ejection unit 112 such that the ejection direction of the ink droplet is a direction toward the molding table 116. Further, during the main scanning operation, the carriage 132 moves along the guide rail 134 while holding the ejection unit 112. The guide rail 134 is a rail-shaped member that guides the movement of the carriage 132, and moves the carriage 132 according to an instruction of the controller 118 during the main scanning operation.

Note that the movement of the ejection unit 112 in the main scanning operation may be a relative movement with respect to the molded object 130. For example, the position of the ejection unit 112 may be fixed, and the molded object 130 may be moved by moving the molding table 116.

The movable unit 117 is a conveyance mechanism that changes a distance between the ejection unit 112 and the molding table 116. An upper surface of the molding table 116 of this embodiment is moved in the vertical direction (Z direction in FIG. 8) by the movable unit 117. The upper surface of the molding table 116 moves in accordance with the progress of molding of the molded object 130 under the instruction of the controller 118. In this way, a distance (gap) between a surface to be molded in the molded object 130 in the middle of molding and the ejection unit 112 is appropriately adjusted. Here, the surface to be molded of the molded object 130 is, for example, a surface on which the next layer is formed by the ejection unit 112. Note that the adjustment of the distance between the ejection unit 112 and the molding table 116 may be performed by moving an ejection unit 112 side up and down.

The controller 118 is, for example, a central processing unit (CPU) of the 3D printer 110, and controls each unit of the 3D printer 110 based on slice data indicating shape information, color image information, and the like of the molded object 130 to be molded to control an operation of molding of the molded object 130.

The user PC 140 is an information processing unit including a display 140A and an input part 140B that includes a keyboard, a mouse, and the like. The user PC 140 of this embodiment transmits 3D model data indicating the molded object 130 in a predetermined format as a molding job to the control PC 142. The 3D model data is data indicating the shape, the surface color, and the like of the molded object 130, and is created based on, for example, 3D CAD data, data of an appearance obtained by photographing the molded object 130 to be manufactured, and the like.

The control PC 142 is an information processing unit that controls the 3D printer 110 and receives the molding job from the user PC 140. The control PC 142 generates slice data corresponding to a cross section of each position of the molded object 130 based on the molding job (3D model data) received from the user PC 140. Subsequently, the control PC 142 transmits the slice data corresponding to each position to the 3D printer 110. In the example of FIG. 8, one 3D printer 110 is connected to the control PC 142, which is just an example, and a plurality of 3D printers 110 may be connected to the control PC 142.

Note that the user PC 140 and the control PC 142 include, for example, a CPU that performs arithmetic processing and a storage unit such as a read only memory (ROM) that stores programs and various data in advance, a random access memory (RAM) used as a work area of the CPU, and a hard disk drive (HDD) that stores various information, and transmit and receive various data to and from another information processing unit or the 3D printer 110.

The inkjet head 120 of this embodiment forms the molded object 130 through a multi-pass method in which a plurality of main scanning operations of ejecting the ink droplet are performed while the inkjet head 120 moves in the main scanning direction (Y direction) on each position in a region to be molded where the molded object 130 is formed on the molding table 116. More specifically, the ejection of the ink droplet in the forward movement of the inkjet head 120 in the main scanning operation is defined as a first pass (first main scanning operation), the ejection of ink droplet in the backward movement is defined as a second pass, and the next forward movement and backward movement are defined as a third pass and a fourth pass respectively.

As described above, the multi-pass method enables formation of a higher-definition molded object 130 by forming three or more ink dots on each position in the region to be molded. note that the multi-pass of this embodiment is, for example, four passes in which the main scanning operations are performed four times and the ink droplet is ejected to each position in the region to be molded four times.

Figure 9:
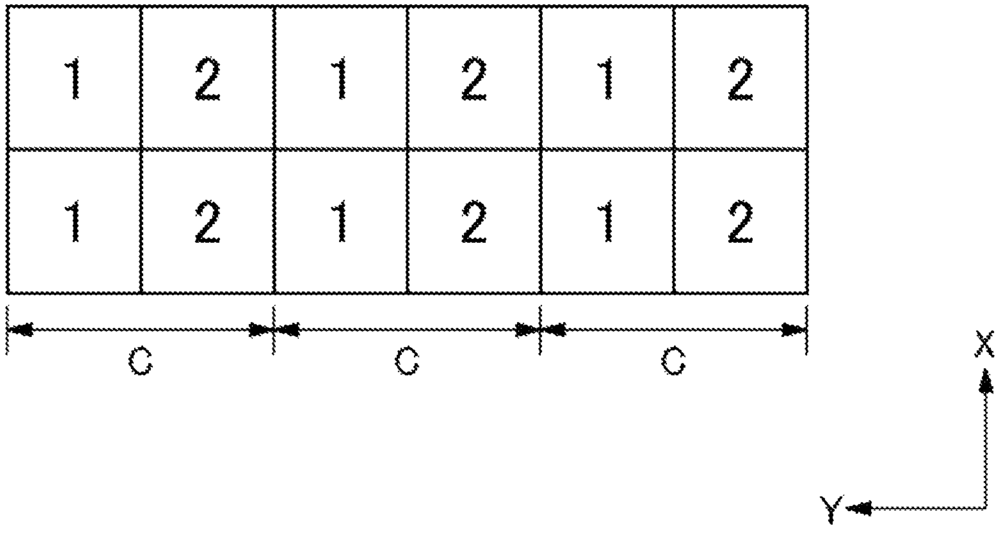
FIG. 9 is schematic views illustrating the number of times of ejection of ink droplets in a multi-pass method, (A) of FIG. 9 shows a case of two passes, and (B) of FIG. 9 shows a case of four passes.
Figure 9:
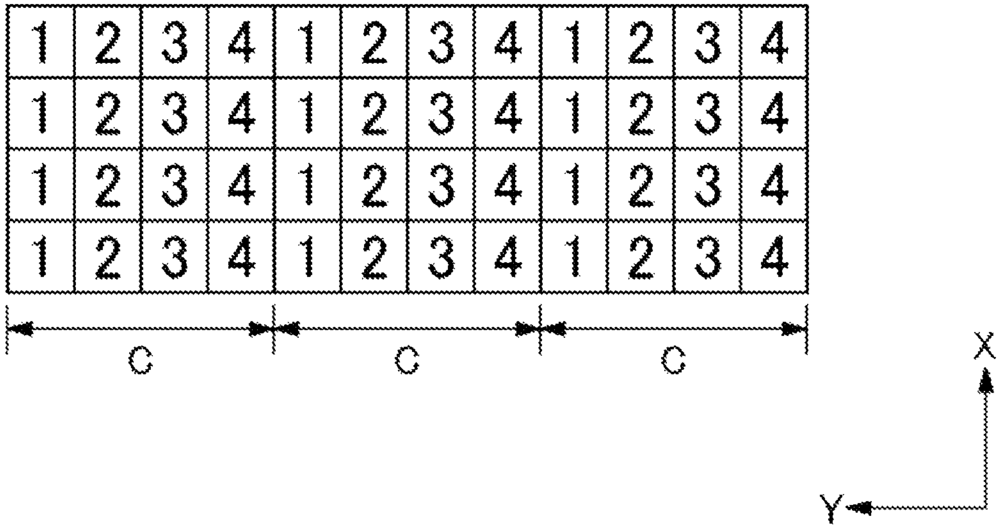

FIG. 9 is a schematic view illustrating the number of times of ejection of ink droplets in the multi-pass method, (A) of FIG. 9 shows a case of two passes, and (B) of FIG. 9 shows a case of four passes. The region C shown in FIG. 9 indicates each position where the ink droplet is ejected, and the ink droplets corresponding to the number of times of passes are ejected to this region C a plurality of times to form the ink dots. Further, each rectangular area included in the region C indicates an ejection position of the ink droplet, and the numerical value indicates the number of times of passes for ejecting the ink droplet to the position indicated by the rectangular area. In other words, in the example of (B) of FIG. 9, the ink droplets are ejected in the order of the first pass, the second pass, the third pass, and the fourth pass from the left side of the figure at each position indicated in the region C. Note that the order in which the ink droplets are ejected at each position is not limited thereto. For example, the ink droplets may be ejected in the order of the first pass, the third pass, the second pass, and the fourth pass from the left side of the figure at each position.

Figure 10:
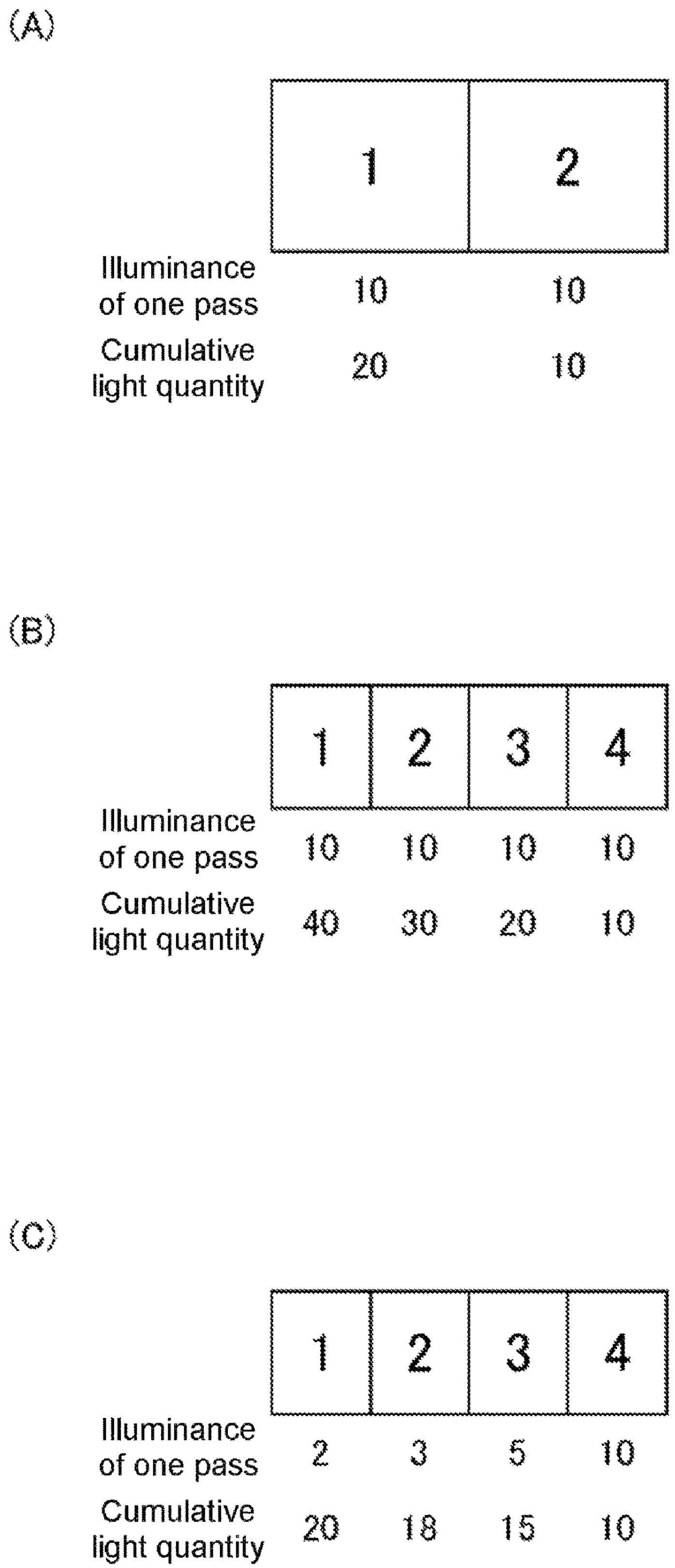
FIG. 10 is schematic views illustrating a cumulative light quantity for each ink dot, (A) of FIG. 10 shows a cumulative light quantity in a case where the illuminance in each pass is the same in the two passes, (B) of FIG. 10 shows a cumulative light quantity in a case where the illuminance in each pass is the same in the four passes, and (C) of FIG. 10 shows a cumulative light quantity in a case where the illuminance is made smaller for earlier passes in the four passes.

FIG. 10 is schematic views illustrating a cumulative light quantity for each ink dot, (A) of FIG. 10 shows a cumulative light quantity in a case where the illuminance of each pass is the same in the two passes, (B) of FIG. 10 shows a cumulative light quantity in a case where the illuminance of each pass is the same in the four passes, and (C) of FIG. 10 shows a cumulative light quantity in a case where the illuminance is made smaller for earlier passes in the four passes. Further, the illuminance of one pass shown in FIG. 10 indicates the magnitude of the illuminance of the ultraviolet rays emitted from the light source 122 every time each ink dot is formed. Note that although a value indicating the illuminance (light quantity) does not indicate an actual value, the illuminance "10" is a value that can completely cure the ink dot.

Here, the ink dot formed in earlier passes is also irradiated with the ultraviolet rays with which the ink dot formed in later passes is irradiated. Thus, the cumulative light quantity for the ink dot formed earlier becomes higher than that of the ink dot formed later. For example, in (A) of FIG. 10, the cumulative light quantity for the ink dot formed in the first pass is twice the cumulative light quantity for the ink dot formed in the second pass.

In the example of (B) of FIG. 10, the cumulative light quantity for the ink dot formed in the first pass is four times the cumulative light quantity for the ink dot formed in the fourth pass. The cumulative light quantity for the ink dot formed in the first pass is excessive, and the ink dot formed in the first pass becomes overcured. When the ink dot is overcured, a warp may occur in the molded object 130, or the strength and color tone may be affected. Further, when the flattening roller 124 performs flattening, shavings at the overcured part may adhere to the molded object 130 again and become stains on the molded object 130.

Accordingly, the molding device 101 of this embodiment forms the molded object 130 through the multi-pass method, and performs control of reducing the illuminance of the light emitted from the light source 122 in earlier main scanning operations among the plurality of main scanning operations (hereinafter referred to as "multi-pass illuminance control") on each position (region C).

(C) of FIG. 10 shows the cumulative light quantity for each ink dot in the multi-pass illuminance control. In the example of (C) of FIG. 10, the illuminance in the first pass is "2", the illuminance in the second pass is "3", the illuminance in the third pass is "5", and the illuminance in the fourth pass is "10". Accordingly, the cumulative light quantity for the ink dot formed in the first pass is "20", the cumulative light quantity for the ink dot formed in the second pass is "18", the cumulative light quantity for the ink dot formed in the third pass is "15", and the cumulative light quantity for the ink dot formed in the fourth pass is "10".

As illustrated in (C) of FIG. 10, the cumulative light quantity in the last fourth pass for the ink dot formed in the first pass becomes the same cumulative light quantity as that in the second pass in the example of two passes shown in (A) of FIG. 10 by performing the multi-pass illuminance control. In this way, with the multi-pass illuminance control of this embodiment, when forming the molded object 130 through the multi-pass method, the cumulative light quantity of the light for curing the ink dot formed by the ink droplet ejected earlier can be suppressed, and therefore, overcuring of the ink dot formed earlier can be suppressed.

Further, as described above, the illuminance of the light emitted from the light source 122 of this embodiment is increased gradually such that the illuminance of the light emitted to the ink dot first is increased as the ink dot is formed later at each region C. In this embodiment, the illuminance in the first pass is a first illuminance, the illuminance in the second pass is a second illuminance, the illuminance in the third pass is a third illuminance, and the illuminance in the fourth pass is a fourth illuminance. Further, the relationship among the magnitudes of the illuminance is the first illuminance<the second illuminance<the third illuminance<the fourth illuminance. note that the magnitudes of the first illuminance, the second illuminance, the third illuminance, and the fourth illuminance are predetermined.

In addition, the illuminance of the light emitted from the light source 122 to the ink dot formed last at each region C is set as the illuminance at which the ink dot is completely cured, and the illuminance of the light emitted from the light source 122 to the ink dot formed before the last is set as the illuminance at which the ink dot is not completely cured by only one irradiation. In other words, while the fourth illuminance may have a magnitude that completely cures the ink dot, the first illuminance, the second illuminance, and the third illuminance may be an illuminance that brings the ink dot into a semi-cured state. Accordingly, overcuring of the ink dot formed earlier can be suppressed, and the ink dot formed last can completely be cured.

Note that the magnitudes of the first illuminance, the second illuminance, the third illuminance, and the fourth illuminance may not be different from each other, and for example, the relationship of the first illuminance=the second illuminance=the third illuminance<the fourth illuminance may be satisfied. Further, the illuminance for the ink dot formed last may be an illuminance at which the ink dot is not completely cured. In this case, the ink dot formed last is completely cured by the ultraviolet rays emitted to cure the ink dot stacked thereon.

Further, the light source 122 may emit the light such that the cumulative light quantities for a plurality of the ink dots formed at each position are made equal. Note that the word "equal" as used herein means, for example, that the difference between the largest cumulative light quantity for the ink dot and the smallest cumulative light quantity for the ink dot is twice or less. In this way, the degrees of curing of the plurality of ink dots formed at each position on the molding table 116 can be made equal.

Figure 11:
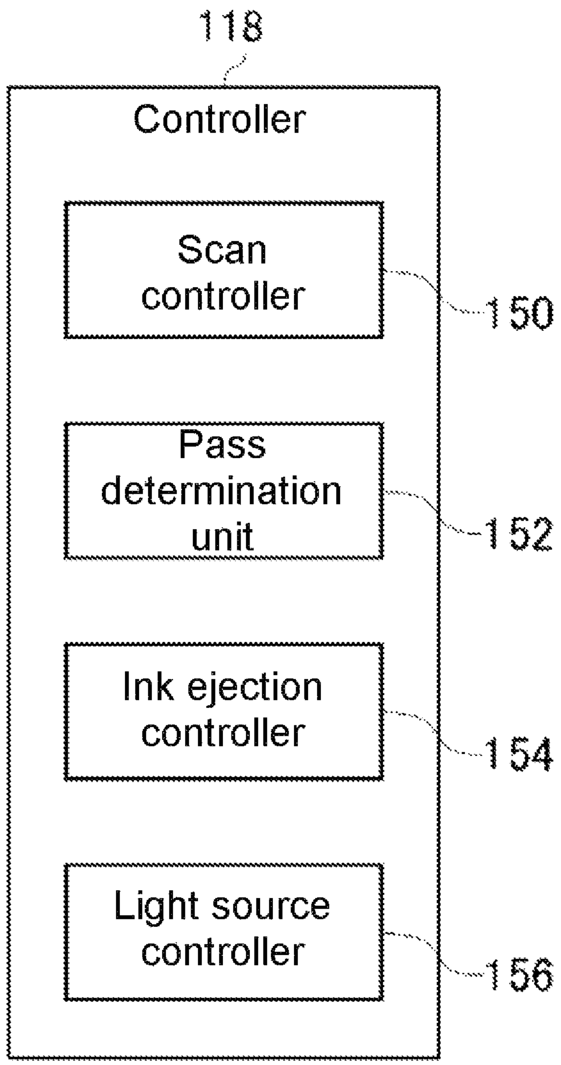
FIG. 11 is a functional block diagram related to multi-pass illuminance control of the embodiment.

FIG. 11 is a functional block diagram related to a molding process executed by the 3D printer 110 of this embodiment. The controller 118 included in the 3D printer 110 includes a scan controller 150, a pass determination unit 152, an ink ejection controller 154, and a light source controller 156.

The scan controller 150 controls driving of the scanning driving unit 114 and the movable unit 117 so that the ejection unit 112 moves in the main scanning direction (Y direction) and the sub scanning direction (X direction) and the molding table 116 moves in the vertical direction (Z direction).

The pass determination unit 152 determines a moving state (forward movement or backward movement) of the ejection unit 112 in the main scanning direction, that is, the current pass number of the inkjet head 120 that is moving in the main scanning direction while ejecting ink droplets.

The ink ejection controller 154 controls the inkjet head 120 to eject ink droplets based on slice data transmitted from the control PC 142.

The light source controller 156 controls the illuminance of the ultraviolet rays emitted from the light source 122 based on the determination result of the pass determination unit 152. In other words, the ink dot formed in the first pass is irradiated with the ultraviolet rays at the first illuminance, the ink dot formed in the second pass is irradiated with the ultraviolet rays at the second illuminance, the ink dot formed in the third pass is irradiated with the ultraviolet rays at the third illuminance, and the ink dot formed in the fourth pass is irradiated with the ultraviolet rays at the fourth illuminance.

Figure 12:
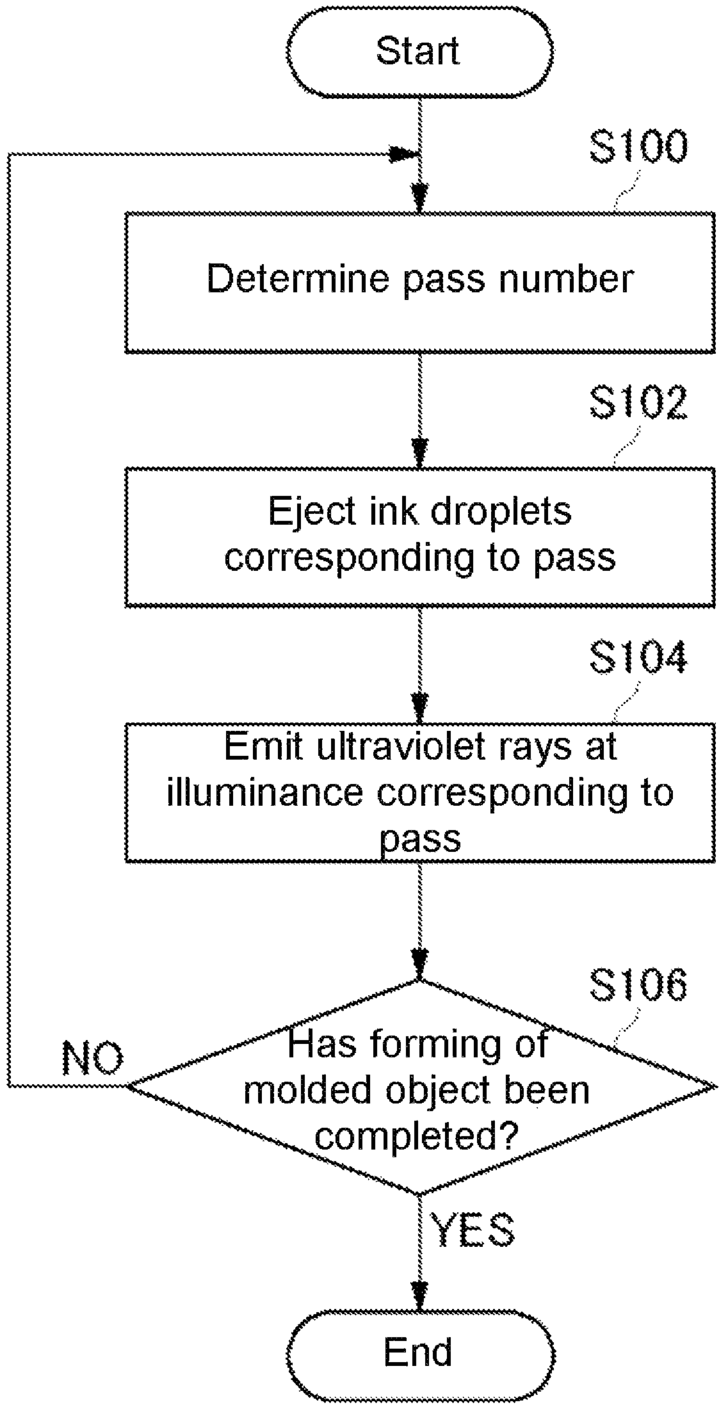
FIG. 12 is a flowchart illustrating a flow of a multi-pass illuminance control process of the molding device of the embodiment.

FIG. 12 is a flowchart illustrating a flow of a multi-pass illuminance control process of the molding device 101 of this embodiment. Note that the multi-pass illuminance control process shown in FIG. 12 is executed as a part of the molding process.

First, in step S100, the pass determination unit 152 determines the current pass number.

In the next step S102, the inkjet head 120 ejects ink droplets corresponding to the pass number determined in step S100 toward the molding table 116.

In the next step S104, the light source 122 irradiates the ink dot formed by the ink droplet impacted on the molding table 116 with the ultraviolet rays at the illuminance corresponding to the pass number determined in step S100.

In the next step S106, it is determined whether or not forming of the molded object 130 has been completed, and while if YES, this molding process is terminated, if NO, the process returns to step S100 and the molded object 130 is formed by repeating step S100 to step S104 and layering the ink dots.

As described above, while this invention has been described using the above embodiments, the technical scope of this invention is not limited to the range described in the above embodiments. Various modifications or improvements can be made to the above embodiments without departing from the gist of the invention, and a mode in which the modifications or improvements are made is also included in the technical scope of this invention. In addition, the above embodiments may be appropriately combined.

In the above embodiment, a mode in which the multi-pass has four passes has been described, but this invention is not limited thereto. For example, the multi-pass may have three or more passes.

In the above embodiment, a mode in which the light with a predetermined wavelength emitted from the light source 122 is ultraviolet rays has been described, but this invention is not limited thereto. As long as photo-curing ink (resin) can be cured, the light source 122 may emit light with another wavelength such as infrared rays.

In the above embodiment, a mode in which the molding device 101 is configured as a system including the 3D printer 110, the user PC 140, and the control PC 142 has been described, but this invention is not limited thereto. For example, an information processing unit having functions of the user PC 140 and the control PC 142 may be connected to the 3D printer 110.

Effects of Embodiments (1) The molding device 101 of this embodiment includes the inkjet head 120 that ejects an ink droplet of a curable ink which cures under a light with a predetermined wavelength, and the light source 122 that irradiates an ink dot formed by the impacted ink droplet with the light. In the molding device 101, the molded object 130 is formed by layering the ink dots. The inkjet head 120 forms the molded object 130 through the multi-pass method in which a plurality of main scanning operations of ejecting the ink droplet are performed while the inkjet head 120 moves in a predetermined main scanning direction on each position in a region to be molded where the molded object 130 is formed, and the illuminance of the ultraviolet rays emitted from the light source 122 is decreased in earlier main scanning operations among the plurality of main scanning operations on each position.

With this embodiment, when the molded object 130 is formed through the multi-pass method, the cumulative light quantity of the light for curing the ink dot formed by the ink droplet ejected earlier can be suppressed, and therefore, overcuring of the ink dot formed earlier can be suppressed.

(2) In the molding device 101 of this embodiment, the illuminance of the ultraviolet rays emitted from the light source 122 is increased gradually such that the illuminance of the ultraviolet rays emitted to the ink dot formed first is increased as the ink dot is formed later at each position. With this embodiment, overcuring of the ink dot formed earlier can be suppressed.

(3) In the molding device 101 of this embodiment, the illuminance of the ultraviolet rays emitted from the light source 122 to the ink dot formed last at each position is set as the illuminance at which the ink dot is completely cured, and the illuminance of the ultraviolet rays emitted to the ink dot formed before the last is set as the illuminance at which the ink dot is not completely cured by only one irradiation. With this embodiment, overcuring of the ink dot formed earlier can be suppressed.

(4) In the molding device 101 of this embodiment, the light source 122 may emit the light such that the cumulative light quantities for the plurality of ink dots formed at each position are made equal. With this embodiment, the degrees of curing of the plurality of ink dots formed at each position on the molding table 116 can be made equal.

INDUSTRIAL APPLICABILITY

This invention relates to a molding device that forms a three-dimensional object by ejecting ink.

The invention claimed is:

1. A molding device, comprising:

a color inkjet head configured to eject a color ink, wherein the color inkjet head is configured to eject the color ink to be layered in a vertical direction to color and form a molded object;

a clear inkjet head configured to eject a clear ink, wherein the clear inkjet head is configured to eject the clear ink to compensate a layering amount of the color ink;

an input part including a keyboard or a mouse, configured to input a compensation amount of the clear ink for each layer forming the molded object, such that an impact frequency of the clear ink becomes low for each layer where an impact frequency of the color ink in coloring and forming the molded object is high, and the impact frequency of the clear ink becomes high for each layer where the impact frequency of the color ink is low, wherein each layer forming the molded object has a reference thickness;

a processor configured to:

receive the compensation amount of the clear ink which is input through the input part, wherein one of options divided into a plurality of stages from a state where the compensation amount of the clear ink is small to a state where the compensation amount of the clear ink is large is input, calculate, in the each layer, a thickness of the color ink in the vertical direction corresponding to a color concentration for coloring the molded object, and calculate a reference value of the compensation amount of the clear ink in the each layer in the vertical direction by subtracting the thickness of the color ink from the reference thickness of each layer, wherein the reference value of the compensation amount of the clear ink corresponding to the color concentration of a color image for coloring the molded object is calculated;

a display, wherein the reference value calculated by the processor is displayed on the display.

2. The molding device as set forth in claim 1, wherein the impact frequency of the color ink corresponds to the color concentration of the color image for coloring the molded object, and the compensation amount of the clear ink is input by using the input part such that the impact frequency of the clear ink becomes low at a place where the color concentration is high, and the impact frequency of the clear ink becomes high at a place where the color concentration is low in the color image.

3. The molding device as set forth in claim 1, wherein the compensation amount of the clear ink is input such that a thickness of the each layer forming the molded object stays constant.

4. The molding device as set forth in claim 1, wherein the processor is provided in an information processing unit including the display on which the color image for coloring the molded object is displayed.

5. The molding device as set forth in claim 1, wherein the compensation amount of the clear ink is input for each of a plurality of regions obtained by virtually dividing the molded object.

* * * * *